(12) United States Patent
Konijn

(10) Patent No.: US 10,315,142 B2
(45) Date of Patent: Jun. 11, 2019

(54) SEPARATOR COLUMN

(71) Applicant: SHELL OIL COMPANY, Houston, TX (US)

(72) Inventor: Gerrit Konijn, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 192 days.

(21) Appl. No.: 15/500,155

(22) PCT Filed: Aug. 3, 2015

(86) PCT No.: PCT/EP2015/067777
§ 371 (c)(1),
(2) Date: Jan. 30, 2017

(87) PCT Pub. No.: WO2016/016467
PCT Pub. Date: Feb. 4, 2016

(65) Prior Publication Data
US 2018/0221800 A1 Aug. 9, 2018

(30) Foreign Application Priority Data

Aug. 1, 2014 (EP) .................... 14179440

(51) Int. Cl.
*B01D 45/16* (2006.01)
*B01D 53/24* (2006.01)
*B01D 45/08* (2006.01)

(52) U.S. Cl.
CPC ............. *B01D 45/16* (2013.01); *B01D 45/08* (2013.01); *B01D 53/24* (2013.01)

(58) Field of Classification Search
CPC ........ B01D 45/12; B01D 45/16; B01D 50/00; B01D 53/24
USPC .......................................... 55/315, 318, 457
See application file for complete search history.

(56) References Cited

U.S. PATENT DOCUMENTS

| | | | |
|---|---|---|---|
| 4,015,960 A | 4/1977 | Nutter | |
| 4,537,608 A | 8/1985 | Koslow | |
| 6,227,524 B1 | 5/2001 | Kiselev et al. | |
| 7,350,448 B2 | 4/2008 | Bell et al. | |
| 8,025,706 B2 | 9/2011 | Poorte | |
| 9,597,622 B2 * | 3/2017 | Grave | C10L 3/101 |
| 2010/0011961 A1 | 1/2010 | Poorte | |
| 2015/0157922 A1 * | 6/2015 | Renshaw | A63C 10/14 |
| | | | 280/14.22 |

FOREIGN PATENT DOCUMENTS

| | | |
|---|---|---|
| EP | 0048508 | 3/1982 |
| EP | 2335799 | 6/2011 |
| WO | 201019669 | 2/2010 |
| WO | 201387919 | 6/2013 |

* cited by examiner

Primary Examiner — Robert A Hopkins

(57) ABSTRACT

Separator column (1) with at least one demister, such as a swirl deck (17), crossing the flow path, and a coalescer deck (7) crossing the flow path upstream the demister. The coalescer deck carries at least one coalescer (8) comprising an uninterrupted coalescer tube (9) with an upstream open end (11), a downstream open end (12), and a swirler (13) between the two open ends. A direct flow path extends between a downstream edge of the coalescer tube and the demister.

10 Claims, 2 Drawing Sheets

SEPARATOR COLUMN

PRIORITY CLAIM

Figure 1:
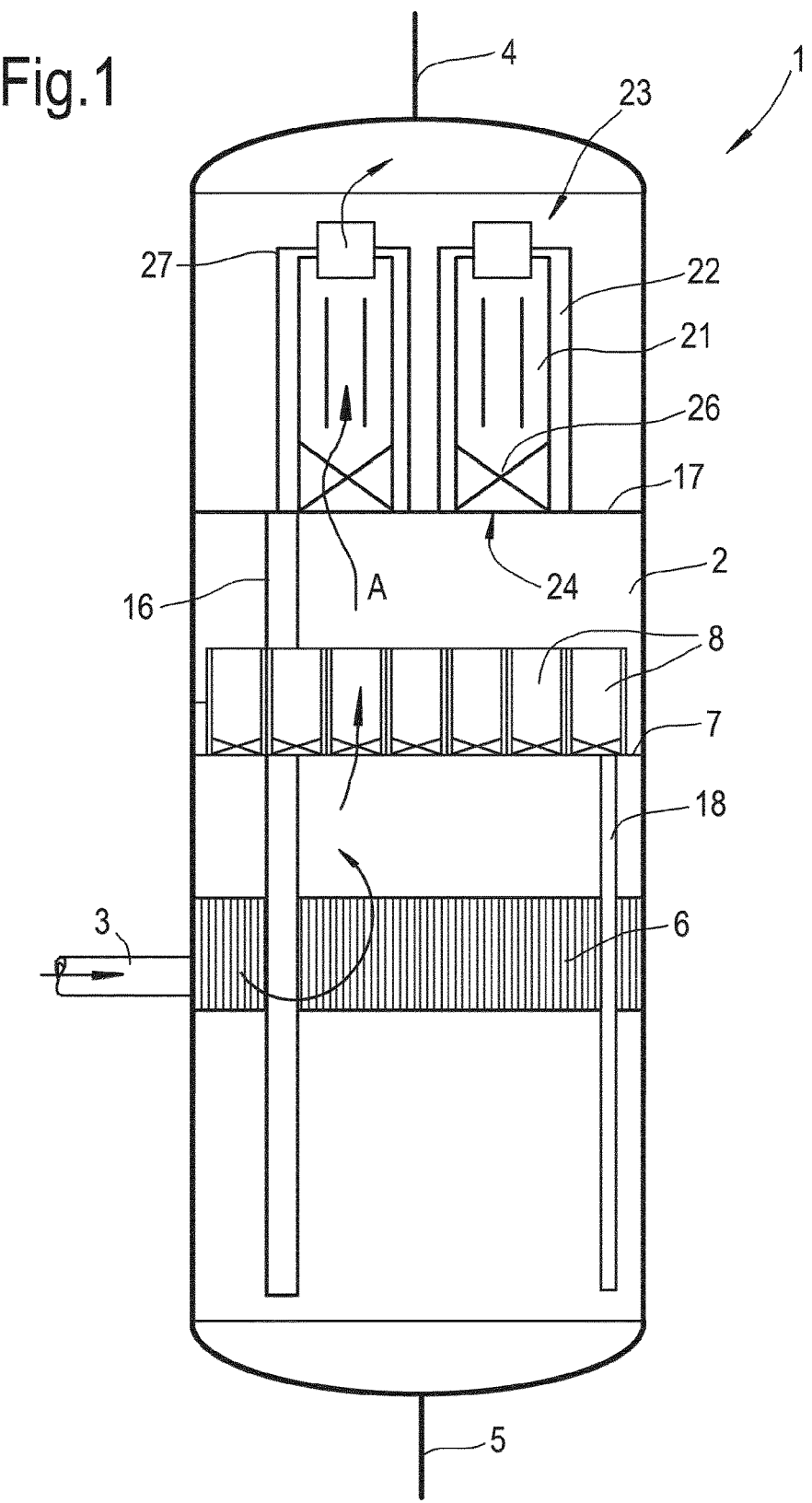

The present application is the National Stage (§ 371) of International Application No. PCT/EP2015/067777 filed Aug. 3, 2015, which claims priority from European Patent No. 14179440.4, filed Aug. 1, 2014 incorporated herein by reference.

The invention pertains to a separator column comprising at least one demister, such as a swirl deck with one or more swirl tubes. Such separator columns are for example used for separating liquid components from a gas flow or for contacting a gas with a liquid to transfer components and/or heat, where the demister serves to separate the contacted gas and liquid phases.

EP 0 048 508 A2 discloses a phase separator column comprising a number of decks with swirl tubes. The swirl tubes comprise a tube with an open downstream end and an open upstream end, and a swirler contained within the tube. The swirler is shaped to impart rotary movement to a passing gas flow. Gas bearing liquid droplets flows through the tubes and passes the swirler. Liquid is swirled against the inner wall of the swirl tube and leaves the tube via slits or openings in the tube wall while the gas flows through the tube. In other prior art systems the swirl tubes are provided with deflector rings providing a U-turn flow path for liquid collected at the downstream end of the swirl tube.

US 2010/0011961 discloses a fluid separating vessel that comprises: a liquid outlet near the bottom of the vessel; a gaseous fluid outlet near the top of the vessel; a plurality of cyclones arranged in an upper region of the vessel in which at least some liquid droplets that may be entrained in the substantially gaseous fluid stream flowing in upward direction from a fluid inlet towards the gaseous fluid outlet are coalesced, separated from the gaseous carrier fluid and induced to drip down towards the liquid outlet via a liquid return conduit; and a plurality of rotating liquid coalescing centrifuges that are arranged below the cyclones, in which liquid coalescing centrifuges fluid fed to the cyclones is pre-treated such that at least some liquid droplets that may be entrained in the substantially gaseous fluid stream flowing in upward direction from the fluid inlet towards the cyclones are coalesced. Demister performance improves if the liquid in the gas flow forms larger droplets, since larger droplets are easier to separate by a demister. To increase droplet size, swirl tube separators are typically provided with a so-called coalescer mist mat or coalescer vanes to coalesce smaller droplets into larger ones before the droplets enter the swirls tubes. However, such mist mats are sensitive for fouling. Coalescer vanes are less effective.

It is an object of the invention to provide a separator column combining good phase separating efficiency with low sensitivity for fouling.

The object of the invention is achieved with a separator column defining a gas flow path and having at least one demister, such as a swirl deck, crossing the flow path. The separator column further comprises a coalescer deck upstream the demister. The coalescer deck carries at least one coalescer comprising an uninterrupted coalescer tube with an upstream open end, a downstream open end, and a swirler between the two open ends. A direct flow path between a downstream edge of the coalescer and the demister allows free flowing of the droplets to the demister without being deflected by a deflector or a similar obstacle.

Such coalescers have a similar configuration compared to swirl tubes of a swirl deck but the coalescers do not have a deflector and have an uninterrupted tube without slits or openings for discharging collected liquid. Since they do not comprise a deflector at their downstream edge a direct flow path is maintained from the coalescer to the downstream demister. When gas carrying small droplets enters the coalescer, the swirler imparts rotary movement to the small droplets, which are swirled against the inner wall of the coalescer tube. A liquid film is collected on the inner wall of the coalescer tube and thrusted in flow direction of the treated gas. At the downstream edge of the coalescer tube the liquid is redispersed forming droplets of a larger size than the droplets entering the upstream end of the coalescer. The larger droplets can freely flow from the coalescers' downstream edge into the demister. The larger average droplet size substantially improves the separation efficiency of the demister.

The coalescers are not sensitive for fouling and were found to generate larger droplets compared to coalescer vanes, particularly at higher pressures.

As opposed to coalescing techniques known in the prior art, which for example employ rotating liquid coalescing centrifuges such as disclosed in US 2010/0011961, the coalescers of the present invention do not comprise moving parts, as coalescing of the droplets according to the present invention is brought about by a swirler. Swirlers create inertial forces on liquid entrained in a gas stream as the gas stream passes around a coil/helix/spiral at the entrance of a swirler tube.

The present invention further is a different process than for example described in U.S. Pat. No. 4,015,960, which discloses a gas-liquid separation process in which a gas stream with entrained liquid is given a helical motion using one axial cyclone (or "tuyere") which causes the entrained liquid to form a liquid film on the wall of a separation chamber, the liquid being released through a liquid drain opening at the lower end of the separation chamber wall, with gases being discharged through a tailpipe which extends inwardly into the downstream end of the separation chamber. The axial cyclone of U.S. Pat. No. 4,015,960 thus has a separation function, whereas the coalescer of the present invention serves to generate larger droplets from (very) small droplets.

Other processes relating to gases which are in contact with liquids are disclosed for example in WO 2010/019669 and U.S. Pat. No. 6,227,524. Those cases focus on a mass transfer and/or heat exchange process in which a gas is first introduced into a system, after which the gas is intimately contacted with a liquid, followed by separating the liquids from the gas. For the intimate contact (i.e. for high efficiency), the interfacial area should be maximized by creating very small drops. In contrast to this requirement of small droplets in the prior art mass transfer and/or heat exchange processes, according to the present invention larger droplets are generated. In the process of the present invention, a mixture of gas and small liquid droplets enters the coalescing tube with the specific aim to make larger droplets. According to the present invention, the coalescers are not used for separating liquids from the gas stream.

In an embodiment, the coalescer deck can be provided with an overflow drain. Separated liquid from a downstream demister can for example be collected on the coalescer deck until the liquid reaches the level of the overflow drain. This is particularly useful if the demister is a swirl deck with swirler tubes grouped in boxes, which would otherwise require that each box would have its own drain connected to a collection header which discharges to the column's bottom. Instead, liquid can now be collected on the coalescer deck and subsequently be drained via a single overflow drain of the coalescer deck. This results in a simpler drainage system.

Collecting liquid on the coalescer deck has the further advantage that the liquid can be recirculated. Thus, in an embodiment, the coalescer tube can be provided with one or more recirculation inlets above a bottom surface of the coalescer deck and below the level of the overflow drain of the coalescer deck. Larger droplets that leave the coalescer tubes are separated by gravity and are recollected on the coalescer deck without reaching the downstream demister. Here it mixes with liquid collected from the downstream demister. The collected liquid on the coalescer deck is drawn through the recirculation inlets by the passing gas flow. This enhances the liquid content in the gas flow. This contributes to the formation of even larger droplets.

The circulation inlets can for example be below the level of the swirler in the coalescer tube. This has the advantage that the swirling motion is also imparted to the recycled liquid. Alternatively, or additionally, in another embodiment, the circulation inlets are at and/or above the level of the swirler, or a combination of circulation inlets can be used at different levels relative to the swirler level.

A deck with coalescer tubes provided with circulation inlets as herein described can be used as a scrub deck, e.g., for washing solid or liquid contaminants from a gas flow using a washing liquid. The washing liquid absorbs the contaminants and is subsequently separated from the gas flow by the demister.

In an embodiment of the invention, the demister comprises at least one swirl deck carrying one or more swirl tubes, in particular swirl tubes having a lower swirling intensity than the coalescer tubes. Swirling intensity is a function of the tube diameter and the entrance angle of the swirler. Larger diameters result in lower swirling intensities. The entrance angle is the dihedral angle that the swirler vane makes with a horizontal plane at the entry side of the tube. Larger entrance angles result in lower swirling intensities. Therefore, in another embodiment, the swirl tubes have a larger entrance angle than the coalescer tubes.

In a further embodiment, the diameter of the swirl tubes is larger than the diameter of the coalescer tubes. Preferably, the ratio $D_c/Ds$ of the coalescer tube diameter $D_c$ to the swirl tube diameter Ds is in the range of 0.2 to 0.75. For instance, if the diameter of the swirl tubes is 100-110 mm, the diameter of the coalescer tubes may be about 25-75 mm. Other diameters can also be used if so desired.

As a result the number of coalescer tubes will generally be higher than the number of swirl tubes. Good results are achieved if 5-10, e.g., 6-7 coalescer tubes are used for each swirl tube.

Optionally, the swirl deck can be provided with a drain transferring liquid from the swirl deck to an upstream coalescer deck.

Alternatively, the demister may comprise one or more mesh type demisters and/or one or more vane packs or similar demisters, optionally in combination with one or more swirl decks.

Optionally, the column may be provided with a gas inlet provided with a flow distributor comprising a series of curved guiding vanes, the leading end of each vane making a sharp angle with the direction of the main flow of the mixture entering the column. Each vane intercepts and deflects part of the gas flow, and is capable of effecting a separation between liquid and gas. The vanes are placed at such a distance from each other that a substantially uniform distribution of gas is obtained. A preferred example of such a device is a Schoepentoeter® of Shell. A Schoepentoeter® contributes to a more even distribution of the gas over the entire cross section of the separator column. This helps to reduce any channeling effects through the coalescer and swirl decks and to increase separation.

The swirler of the swirl tube will typically have a plurality of vanes for imparting the rotational movement to the gas flow. They can for example be laser cut from steel plate or a similar material. Suitable swirlers are for example disclosed in WO 2013/087919.

The invention will be further explained with reference to an exemplary embodiment as shown in the accompanying drawing.

Figure 2:
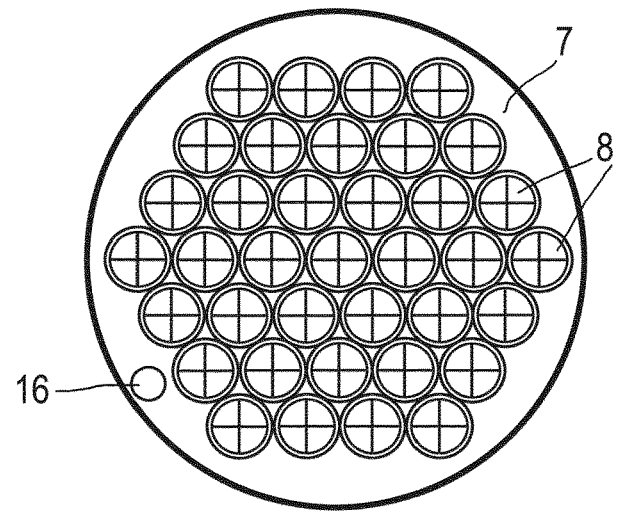
Figure 3:
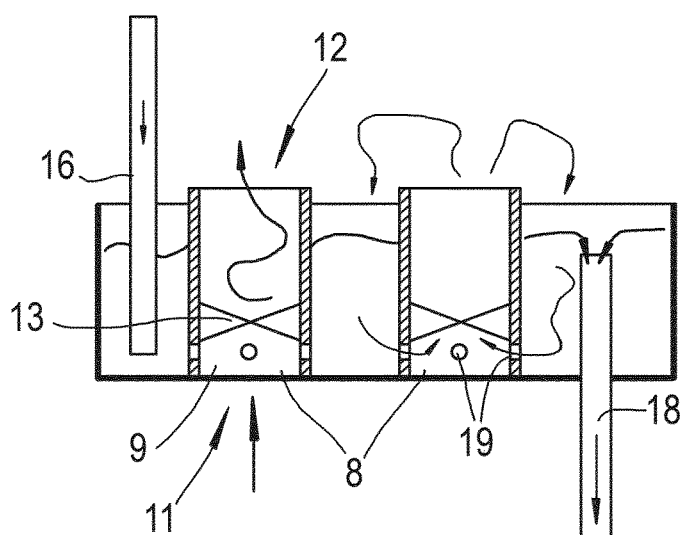
Figure 4:
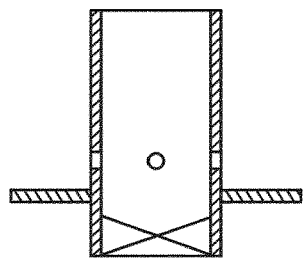

FIG. 1: shows schematically in cross section a separator column;

FIG. 2: shows a top view of the coalescer deck of the column in FIG. 1;

FIG. 3: shows a coalescer deck in cross section;

FIG. 4: shows an alternative embodiment of a coalescer tube.

FIG. 1 shows a separator column 1 for separating liquid from a gas. The column 1 comprises a vessel 2 with an inlet 3 for the gas carrying the liquid to be separated. The vessel 2 has an upper end with a gas outlet 4 and a lower end with a drain 5 for discharging separated liquid. This defines a flow path A in upward direction for the gas flow, while separated liquid flows down by gravity, as explained hereafter.

Gas carrying the liquid to be separated enters the column 1 via the inlet 3 and a Schoepentoeter® 6 connected to the inlet 3. The Schoepentoeter® 6 distributes the gas flow over the full width of the vessel 2.

Downstream the Schoepentoeter® 6 is a coalescer deck 7 shown in top view in FIG. 2. The coalescer deck 7 carries an array of coalescers 8, shown in more detail in FIG. 3. The coalescers 8 comprise an uninterrupted cylindrical coalescer tube 9 with an open upstream end 11, an open downstream end 12, and a swirler 13 within the tube 9 between the two open ends 11, 12.

The separator column 1 comprises a demister 17 downstream the coalescer deck 7. In this exemplary embodiment the demister 17 is a swirl deck 17. A drain 16 from the downstream swirl deck 17 transfers separated liquid from the swirl deck 17 to the coalescer deck 7. Alternatively, or additionally, drains can be used bypassing the coalescer deck and discharging liquid directly to the bottom of the column. The coalescer deck 7 comprises an overflow drain 18. Liquid is collected on the coalescer deck 7 until it overflows the inlet of the overflow drain 18. The overflow drain 18 crosses the Schoepentoeter® 6 and transfers liquid to the lower section of the column 1, where it leaves the vessel 2 via the drain 5. The overflow drain 18 has a weir 20 with a height below the height of the coalescer tube 9.

In the exemplary embodiment of FIG. 1 the coalescer tube 9 is provided with a number of recirculation inlets 19 below the level of the overflow drain 18.

The swirl deck 17 carries a plurality of swirl tubes 21. The figure shows an embodiment with two swirl tubes 21 but the number of swirl tubes 21 per swirl deck 17 can be less or more, if so desired. To provide the swirl tubes 21 with a lower swirling intensity than the coalescers 8, the diameter of the swirl tubes 21 is larger than the diameter of the coalescer tubes 9. Consequently, the number of swirl tubes 21 is lower than the number of coalescers 8.

The swirl tubes 21 comprise a tube 22 with an open downstream end 23, an open upstream end 24, and a swirler 26 contained within the tube 22 between the two open ends 23, 24. The tube 22 comprises a row of slits 27, where the collected liquid is discharged from the tube 22. The liquid is subsequently collected on the swirl deck 17, where it is discharged via the drain 16.

The coalescer deck 7 and the swirl deck 17 cross the flow path A from the gas inlet 3 to the gas outlet 4, so all of the gas passes the coalescers 8 and the swirl tubes 21 subsequently.

After passing the inlet 3 and the Schoepentoeter® 6 the gas flows through the coalescers 8. The swirlers 22 impart a rotational movement to the gas. Liquid droplets in the gas flow are swirled and collected as an upward flowing film on the inner side of the coalescer tube 9. Since the wall of the coalescer tube 9 is uninterrupted, all liquid collected at the inner wall of the inner side of the coalescer tube 9 moves upward to the downstream end of the coalescer tube 9. At the downstream edge of the coalescer tube 9 the liquid film is redispersed to form droplets substantially larger than the droplets entering the coalescer tubes 9. The separator column 1 provides a direct flow path from the upper edge of the coalescer tubes 9 to the swirl deck 17 without any deflectors or other elements crossing the flow path. This allows the gas flow to take up at least a part of the larger droplets. Another part falls back and is recollected on the coalescer deck 7.

The gas carrying the larger droplets enters the swirl tubes 21. Again a rotational movement is imparted to the gas flow by the swirler 22 of the swirl tube 21. Liquid is collected as an upward flowing film on the inner side of the swirl tube 21. The collected liquid leaves the tube 22 via the vertical slits 27. The liquid is collected on the swirl deck 17 in the space around the swirl tubes 21. Via the drain 16 the liquid is discharged to the lower coalescer deck 7. Alternatively, or additionally, drains can be used to discharge the collected liquid to the bottom of the column.

The level of the liquid collected on the coalescer deck 7 will be as high as the level of the inlet of the overflow drain 18, or less at the start of the process. The recirculation inlets 19 in the coalescer tubes 9 are below the level of the collected liquid. The passing gas flow draws liquid through the recirculation inlets 19. This locally increases the liquid content in the gas flow, which results in even larger droplets at the downstream edge of the coalescer tube 9.

FIG. 4 shows an alternative embodiment of the coalescer tube 9A. Here the recirculation inlets are located above the level of the swirler 13.

That which is claimed is:

1. A column defining a gas flow path (A), the column comprising
    at least one demister crossing the flow path;
    a coalescer deck crossing the flow path upstream of the demister;
    wherein the coalescer deck carries at least one coalescer comprising at least one coalescer tube with an upstream open end, a downstream open end, and a swirler between the two open ends;
    wherein the at least one coalescer tube is provided with one or more recirculation inlets located above a bottom surface of the coalescer deck and below a level of an overflow drain of the coalescer deck; and
    wherein the column further comprises a direct flow path between a downstream edge of the coalescer tube and the demister.

2. The column according to claim 1, wherein the coalescer deck is provided with an overflow drain.

3. The column according to claim 1, wherein one or more of the recirculation inlets are below the level of the swirler.

4. The column according to claim 1, wherein one or more of the recirculation inlets are at and/or above the level of the swirler.

5. The column according to claim 1, wherein the demister comprises at least one swirl deck carrying one or more swirl tubes.

6. The column according to claim 5, further comprising a ratio of 5-10 coalescer tubes to each at least one swirl tube.

7. The column according to claim 6, wherein the diameter of the swirl tubes is larger than the diameter of the coalescer tubes.

8. The column according to claim 7, wherein the ratio $D_c/D_s$ of the coalescer tube diameter $D_c$ to the swirl tube diameter Ds is within the range of 0.2 to 0.75.

9. The column according to claim 6, wherein the swirl tubes have a larger entrance angle than the coalescer tubes.

10. The column according to claim 5, wherein the swirl deck is provided with a drain transferring liquid from the swirl deck to the coalescer deck.

* * * * *